Patented Feb. 27, 1934

1,948,924

UNITED STATES PATENT OFFICE 1,948,924

NITROGEN CONTAINING CONVERSION PRODUCTS OF HIGHER ALIPHATIC HYDROCARBON AND PROCESS OF PREPARING THE SAME

Karl Keller, Frankfort - on - the - Main-Fechenheim, Germany, assignor to General Aniline Works, Inc., New York, N. Y., a corporation of Delaware No Drawing. Application January 3, 1930, Serial No. 418,419. In Germany January 8, 1929

8 Claims. (Cl. 260—127)

The present invention relates to new nitrogen-containing conversion products of higher aliphatic hydrocarbons and to a process of preparing the same.

I have found that by halogenating higher hydrocarbons of the aliphatic series containing at least 9 carbon atoms in such a manner that at least two halogen atoms enter into the molecule and by acting on the halogenated derivatives thus obtained with ammonia or ammonia produced in situ, i. e. with agents evolving ammonia, new products of the aliphatic series are obtained which contain nitrogen.

Technical mixtures of hydrocarbons of the aliphatic series containing at least 9 carbon atoms, such as may be produced by starting from natural products or by synthesis, are particularly suitable for my process. The boiling points of these technical mixtures lie above 150° C.

The halogenation may be carried out by the action of either halogen or a hydrohalic acid on saturated or unsaturated hydrocarbons of the aforesaid kind in such a manner, that at least two halogen atoms are introduced into the hydrocarbon molecule. For carrying out the second step of the reaction one may act on the halogenated products obtained by the first step with ammonia in an aqueous or alcoholic solution or with ammonia produced in situ, i. e. with agents evolving ammonia, such as ammonium carbonate or urea. Preferably the action of ammonia etc., is effected by heating the components under an elevated pressure with or without the addition of a catalyst. It is an essential advantage of my present process that one does not need to isolate the halogenated hydrocarbons, but one can produce the final products of reaction in a single operation, when starting from the hydrocarbons.

The course of the reaction is a very complicated one and varies according to the conditions applied. The replacement of one or more halogen atoms by amino groups is an essential feature of my reaction, but apparently in most cases simultaneously halogen atoms are split off from the hydrocarbon molecule, while forming new double bonds and separating an ammonium halide. Often a part of the halogen atoms is so strongly attached to the hydrocarbon molecule, that some halogen atoms remain unchanged in the molecule. But under certain conditions all of the halogen atoms are eliminated. When acting with ammonia with addition of an alcohol, the latter may take part in the reaction in some cases, while forming ethereal groups. Besides the formation of primary amino-groups, secondary or tertiary amino-groups may be formed to a certain degree. Even quaternary ammonium groups can be detected in the final products, but it is possible to work under such conditions that only primary amino-groups are produced practically without the formation of by-products.

As it appears from the aforesaid statements the new reaction products are not homogeneous substances; they represent mixtures of derivatives of hydrocarbons of the aliphatic series containing at least 9 carbon atoms and having a saturated or unsaturated character. They contain nitrogen and are soluble in dilute acids, they may contain halogen. They represent mostly viscous oils. They are isolated in the form of their salts by my present process and may be used directly in this form. The free bases are obtainable therefrom by treating the salts with a solution of an alkali. They may be incorporated in baths used in dyeing processes, for instance as acid soaps. But in consequence of their remarkable reactivity they may be used for further actions of decomposition by treatment with suitable agents, thus representing important intermediates for the production of other valuable products.

The products derived from technical hydrocarbon mixtures known as hard paraffin are particularly valuable.

In order to further illustrate my invention the following examples are given, the parts being by weight and all temperatures in centigrade degrees, but it is understood, that my invention is not limited to the particular products or reacting conditions mentioned therein.

Example 1

39 parts of a dichlorinated derivative of hard paraffin are heated with a solution of 14 parts of ammonia in about 120 parts of alcohol for some hours in an autoclave at about 160–170°. After cooling down, the reaction mass consists of an alcoholic solution, of separated ammonium chloride and some undissolved impurities. From the filtered solution the alcohol is distilled off. It remains a water soluble oil, from which the free basic compound may be isolated by treatment with a caustic alkali solution. The new compound represents a light, viscous oil, containing nitrogen and being soluble in dilute acids.

Example 2

Into 100 parts of vaseline oil of about 255 middle molecular weight, isolated from American petroleum, a current of dry chlorine gas is introduced at about 60–70°, while well stirring. With a strong evolution of hydrochloric acid chlorine enters into the hydrocarbon molecule. When an increase of weight of 57 parts has taken place, the introduction of chlorine is interrupted and the formed reaction product may be heated for some time in vacuo at about 70–80° in order to remove some quantities of dissolved hydrochloric acid gas. It represents a viscous, colorless oil, containing 4 chlorine atoms in the hydrocarbon molecule.

19 parts of this tetrachloro-product are heated without any further purification in the same apparatus, which then is closed, with a solution of 8, 5 parts of ammonia in 100 parts of anhydrous ethylalcohol at about 140° for about 3–4 hours. After cooling down, the reaction mass consists of an alcoholic solution of the reaction product, of separated ammonium chloride and a very small quantity of an insoluble resin-like substance. The solution is separated from the insoluble ingredients by filtration and the alcohol is distilled off. About 17 parts of a brownish oil soluble in water are formed. Its solution has soap qualities. By treatment with a caustic alkali solution the free basic product can be isolated from the solution, representing a brownish oil of low viscosity, soluble in dilute acids.

By introducing only two halogen atoms into vaseline oil and carrying out the process otherwise as described above, a basic compound of similar properties is obtained.

Example 3

200 parts of hard paraffin are heated to about 80°, then, while well stirring, chlorine is introduced at temperatures beginning at 80° and ending at 50–60°, until an increase in weight of 185 parts has taken place. The reaction product which contains about 8 atoms of chlorine, assuming the middle molecular weight of the starting material to be 325 grams, represents a viscous, colorless oil.

30 parts thereof are heated in the same apparatus which then is closed with a solution of 15 parts of ammonia in about 150 parts of alcohol (95%) for 3–4 hours at 140–150° the pressure rising thereby to 20 atmospheres. After cooling down, the alcoholic solution is separated from the ammonium chloride formed by filtration and the alcohol is distilled off. In this manner about 27 parts of a viscous, brownish oil soluble in water and dilute acids are obtained. When treating such a solution, with a dilute caustic alkali solution the free basic compound is obtained as a light brown oil of low viscosity. Apparently it consists substantially of a compound containing two nitrogen-containing basic groups, a double bond and two chlorine atoms in its molecule. When evaporating the aforesaid aqueous alcoholic solution, a small quantity of an oil of a strong alkaline reaction can be isolated, being soluble in dilute acids as well as in dilute alkaline solutions, representing apparently a quaternary ammonium compound.

Example 4

26 parts of a hexachlorinated derivative of hard paraffin, obtainable likewise by chlorinating hard paraffin until the calculated increase of weight, are heated with a solution of 19 parts of ammonia in about 100 parts of methanol or ethanol in an autoclave for about 2–3 hours at 140–150°. After cooling down, the light alcoholic solution is separated from the ammonium chloride formed by filtration and the alcohol is distilled off. About 25 parts of a viscous, light oil remains, representing the hydrochloric salt of the new product formed. The salt is clearly soluble in water and dilute acids. By treating the aqueous solution with a dilute alkali solution the free basic compound can be isolated as a light brown oil of low viscosity. Apparently it consists substantially of a compound containing two nitrogen containing basic groups, one double bond and two chlorine atoms. Probably in this case the alcohol has taken part in the reaction while forming ethereal groups.

When carrying out the interaction of ammonia in an aqueous solution, one may advantageously heat the components in an autoclave for some hours at about 180–190°, whereby a similar product is obtained; when replacing ammonia by about 25 parts of ammonium carbonate and heating the components for about 4 hours at about 150–160°, a light brown oil is obtained, the main ingredient of which apparently is a compound containing one nitrogen-containing basic group, about 5 chlorine atoms but no double bond, showing correspondingly varied properties.

Example 5

Into 100 parts of transformer oil of 0.88 specific gravity, while stirring at 50–70° chlorine is introduced, until an increase of weight of 64 parts has taken place. The absorption of chlorine is particularly easy in this case. The reaction product may be purified from dissolved hydrochloric acid by washing with water.

18 parts of this product of chlorination are heated with a solution of 8 parts of ammonia in about 100 parts of ethylalcohol in an autoclave for 2–3 hours at about 145–150°. The reaction mass is worked up as described in the foregoing examples. The new product thus obtained is a brownish oil of similar properties as the products of the foregoing examples.

Example 6

26.5 parts of the hexachlorinated hard paraffin used in Example 4 are mixed with a solution of 10 parts of ammonia in about 100 parts of ethylalcohol. Then a solution of 0.3 parts of copper sulfate in a small quantitiy of water is added and the mixture is heated for 3 hours in an autoclave at temperatures as used in the foregoing examples. In this manner a clear, water-soluble oil is obtained, from which the free basic compound is obtained by treatment with an alkaline solution. The new compound corresponds in its properties with the product of Example 4, but it differs therefrom by a higher content of nitrogen.

In the following claims I include under the term "acting with ammonia" also acting with ammonia produced in situ i. e. acting with agents evolving ammonia.

I claim:

1. A process which comprises heating chlorinated aliphatic hydrocarbons containing at least 9 carbon atoms and at least 2 chlorine atoms with ammonia in a closed vessel at a temperature between about 140 and about 190° C.

2. Amino nitrogen containing conversion products of aliphatic hydrocarbons containing at least 9 carbon atoms, said conversion products being obtainable by the process defined in claim 1, being soluble in dilute acids, being mostly viscous oils and which may contain chlorine.

3. A process which comprises heating technical mixtures of chlorinated aliphatic hydrocarbons containing at least 9 carbon atoms and at least 2 chlorine atoms with ammonia in a closed vessel at a temperature between about 140 and about 190° C.

4. Amino nitrogen containing conversion products of technical mixtures of aliphatic hydrocarbons containing at least 9 carbon atoms, said conversion products being obtainable by the process defined in claim 3, being soluble in dilute acids, being mostly viscous oils and which may contain chlorine.

5. A process which comprises heating chlorinated derivatives of hard paraffin containing at least 2 chlorine atoms with ammonia in a closed vessel at a temperature between about 140 and about 190° C.

6. Amino nitrogen containing conversion products of hard paraffin, said conversion products being obtainable by the process defined in claim 5, being soluble in dilute acids, being mostly viscous oils and which may contain chlorine.

7. A process which comprises heating a hexachlorinated hard paraffin with a solution of ammonia in a lower aliphatic alcohol with ammonia in a closed vessel at a temperature between about 140 and about 150° C.

8. An amino nitrogen containing conversion product of hard paraffin, said conversion product being obtainable by the process defined in claim 7, being soluble in dilute acids, having an unsaturated character and containing chlorine.

KARL KELLER.